United States Patent
Sawada et al.

(10) Patent No.: US 6,702,402 B1
(45) Date of Patent: Mar. 9, 2004

(54) VEHICULAR BRAKING FORCE CONTROL APPARATUS

(75) Inventors: Masashi Sawada, Toyota (JP); Shigemitsu Nohira, Kariya (JP); Hiroshi Fujita, Okazaki (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/533,826

(22) Filed: Mar. 24, 2000

(30) Foreign Application Priority Data

Mar. 25, 1999 (JP) .......................... 11-082101
Apr. 21, 1999 (JP) .......................... 11-113904

(51) Int. Cl.[7] .................................. B60T 8/34
(52) U.S. Cl. ...................... 303/113.1; 303/DIG. 11; 303/3; 303/10; 303/11
(58) Field of Search ................ 303/3, 10, 11, 303/113.1, 116.1, 119.1, DIG. 11, 113.5, 125

(56) References Cited

U.S. PATENT DOCUMENTS

| | | | |
|---|---|---|---|
| 5,697,680 A | * 12/1997 | Tanaka et al. | 303/125 |
| 5,967,628 A | * 10/1999 | Abe et al. | 303/113.1 X |
| 5,979,998 A | * 11/1999 | Kambe et al. | 303/116.1 |
| 6,120,111 A | * 9/2000 | Sakai | 303/116.1 |
| 6,142,583 A | 11/2000 | Steffes | |
| 6,149,247 A | 11/2000 | Hofmann et al. | |
| 6,328,390 B1 | * 12/2001 | Tozu et al. | 303/113.5 |

FOREIGN PATENT DOCUMENTS

| | | |
|---|---|---|
| DE | 43 36 464 A1 | 4/1995 |
| DE | 4336464 | 4/1995 |
| DE | 44 23 086 A1 | 1/1996 |
| DE | 195 19 832 A1 | 12/1996 |
| DE | 196 13 903 A1 | 10/1997 |
| DE | 197 01 070 A2 | 7/1998 |
| GB | 2 301 628 A | 12/1996 |
| WO | WO 95/11824 A1 | 5/1995 |

* cited by examiner

Primary Examiner—Christopher P. Schwartz
Assistant Examiner—Melanie Torres
(74) Attorney, Agent, or Firm—Burns, Doane, Swecker & Mathis, LLP (57) ABSTRACT

A vehicular braking force control apparatus includes a solenoid valve disposed between a master cylinder and the suction side of a hydraulic pump. A ripple absorption low-pressure reservoir is provided between the solenoid valve and the suction side of the hydraulic pump. The low-pressure reservoir is partitioned, by a partition member, into an operation liquid portion that communicates with an auxiliary suction passage and an air portion where air exists. A spring member for pressing the partition member toward the operation liquid portion side is provided in the air portion.

2 Claims, 7 Drawing Sheets

VEHICULAR BRAKING FORCE CONTROL APPARATUS

This application is based on and claims priority under 35 U.S.C. §119 with respect to Japanese Application No. 11(1999)-82101 filed on Mar. 25, 1999 and Japanese Application No. 11(1999)-113904 filed on Apr. 21, 1999, the entire content of both of which is incorporated herein by reference.

FIELD OF THE INVENTION

The present invention generally relates to vehicle braking systems. More particularly, the present invention pertains to a vehicular braking force control apparatus which adjusts the fluid pressure of a wheel brake while a braking operation is performed and which supplies fluid pressure to the wheel brake and adjusts it while no braking manipulation is performed.

BACKGROUND OF THE INVENTION

One example of a vehicular braking force control apparatus is disclosed in German Unexamined Patent Publication No. 4,336,464. This vehicular braking force control apparatus has a fluid pressure generation device for generating a fluid pressure corresponding to the braking manipulation or operation force, a brake pipe that is connected to at least one wheel brake, and a high-pressure pump for drawing operation fluid from a reservoir and transporting it to the wheel brake at least indirectly. The reservoir is coupled with the brake pipe at least indirectly on the liquid pressure generation device side. The high-pressure pump is connected to the reservoir at least indirectly on the suction side. The apparatus also includes a bendable partition element or diaphragm provided in the reservoir. The diaphragm is bendable in the sucking direction of the high-pressure pump and is bent or deformed by a pressure that is supplied from the brake pipe. This apparatus has an advantage that it can reduce suction ripples of the pump with a relatively simple structure.

However, with the reservoir provided with the bendable partition element or diaphragm, the amount of bending of the diaphragm is limited. To obtain a volume variation that is necessary and sufficient for absorption of ripples, the size of the diaphragm should be increased. To avoid increasing the size of the diaphragm, the thickness of the diaphragm needs to be reduced, in which case sufficient ripple absorption performance may not be attained. Further, the amount of bending associated with the diaphragm tends to vary widely, which leads to the concern that considerable dispersion occurs in the ripple absorption effect.

A need thus exists to be able to reliably reduce suction ripples without increasing the apparatus size.

SUMMARY OF THE INVENTION

According to one aspect of the present invention, a vehicular braking force control apparatus includes a liquid pressure generating device for generating a liquid pressure in accordance with a brake manipulation force, a main reservoir for supplying operation liquid to the liquid pressure generation device, a wheel brake receiving the output liquid pressure of the liquid pressure generation device for braking a wheel, a main passage connecting the liquid pressure generation device to the wheel brake, a liquid pressure adjustment device connected to the wheel brake for adjusting the liquid pressure of the wheel brake, and an electrically-driven pump having a suction side that is connected to the liquid pressure adjustment device. A suction passage connects the suction side of the electrically-driven pump to the liquid pressure adjustment device, and a discharge passage connects the discharge side of the electrically-driven pump to the main passage at a point between the liquid pressure generation device and the liquid pressure adjustment device. A first solenoid valve, which operates in synchronism with discharge of the electrically-driven pump, is provided in the main passage between the liquid pressure generation device and a connecting point where the discharge passage is connected to the main passage. An auxiliary suction passage connects the liquid pressure generation device to the suction side of the electrically-driven pump. A second solenoid valve, which operates in synchronism with discharge of the electrically-driven pump, is provided in the auxiliary suction passage between the liquid pressure generation device and the suction side of the electrically-driven pump. A first check valve is provided in the auxiliary suction passage between the second solenoid valve and the suction side of the electrically-driven pump for allowing passage of operation liquid only from the side of the second solenoid valve to the suction side of the electrically-driven pump. An auxiliary reservoir is located in the suction passage between the liquid pressure adjustment device and the suction side of the electrically-driven pump for storing operation liquid. A low-pressure reservoir provided in the auxiliary suction passage between the second solenoid valve and the first check valve reduces the suction ripple by reducing the pressure at the suction side of the electrically-driven pump in the auxiliary suction passage. The low-pressure reservoir includes an operation liquid portion that communicates with the auxiliary suction passage and an air portion where air exists, with the low-pressure reservoir being partitioned into the operation liquid portion and the air portion by a partition member. The air portion is provided with a spring member for pressing the partition member toward the side of the operation liquid portion.

In a state that the first solenoid valve is closed and the second solenoid valve is opened, while operation liquid is pressurized by the electrically-driven pump, a check valve closest to the suction side of the electrically-driven pump is opened and closed intermittently because the electrically-driven pump sucks operation liquid intermittently. In this operation, the movement of operation liquid being sucked by the electrically-driven pump is abruptly stopped by the check valve. The liquid pressure generation device continues to output operation liquid, and the operation liquid tends to flow into the auxiliary suction passage by a volume larger than the discharge capacity of the electrically-driven pump. As a result, the liquid pressure of the auxiliary suction passage quickly increases and a surge pressure normally occurs. That is, the intermittent opening and closing of the check valve successively normally causes surge pressures in the auxiliary suction passage. This is a phenomenon called suction ripples, whose amplitude is several times greater than the liquid pressure in the auxiliary suction passage.

With the present invention, however, the ripple absorption low-pressure reservoir is provided and has an operation liquid accommodation capacity that varies through expansion/contraction of the spring member. Therefore, even if operation liquid flows into the auxiliary suction passage by a volume larger than the discharge capacity of the electrically-driven pump, part of the operation liquid is temporarily accommodated in the operation liquid portion of the ripple absorption low-pressure reservoir and hence the liquid pressure of the auxiliary suction passage does not unduly increase. Therefore, the liquid pressure in the auxiliary suction passage is kept low and hence the absolute value of the suction ripples is reduced to a small value. Another advantage obtained is that ripple energy is absorbed by the sliding of the partition member and contraction of the spring member of the low-pressure reservoir. Further, because the spring member is small in the dispersion of the bend amount and can store large elastic energy in spite of its small size, the dispersion of its ripple absorption ability is small and the apparatus can be miniaturized.

In a preferred form of the invention, the second solenoid valve is a solenoid valve incorporating an orifice. With this construction, the liquid pressure generated by the liquid pressure generation device is reduced by the second solenoid valve and hence the liquid pressure in the auxiliary suction passage is kept low. This, together with the advantages mentioned above, reduces the absolute value of suction ripples to a small value.

The second solenoid valve can be a linear solenoid valve in which the degree of opening varies continuously. The volume of operation liquid flowing from the liquid pressure generation device into the auxiliary suction passage can thus be relatively precisely controlled to be smaller than the maximum accommodation capacity of the ripple absorption low-pressure reservoir, and the liquid pressure of the auxiliary suction passage does not increase excessively. Therefore, the liquid pressure in the auxiliary suction passage is kept low and hence the absolute value of suction ripples is reduced to a small value.

The second solenoid valve can also be a flow adjustment valve that adjusts the volume of operation liquid flowing into the electrically-driven pump in accordance with the liquid pressure generated by the liquid pressure generation device. The volume of operation liquid flowing from the liquid pressure generation device into the auxiliary suction passage can thus be relatively precisely be controlled and the liquid pressure of the auxiliary suction passage does not increase excessively. Therefore, the liquid pressure of the auxiliary suction passage is kept low and so the absolute value of suction ripples is reduced to a small value.

The vehicular braking force control apparatus can also include a second check valve between the second solenoid valve and the low-pressure reservoir for allowing passage of operation liquid only from the second solenoid valve side toward the low-pressure reservoir side. This makes it more difficult for suction ripples in the auxiliary suction passage to be transmitted to the liquid pressure generation device side.

According to another aspect of the present invention, a vehicular braking force control apparatus includes a liquid pressure generation device for generating a liquid pressure in accordance with the brake manipulation force, a main reservoir for supplying operation liquid to the liquid pressure generation device, a wheel brake receiving the output liquid pressure of the liquid pressure generation device for braking a wheel, a main passage for connecting the liquid pressure generation device to the wheel brake, a liquid pressure adjustment device connected to the wheel brake for adjusting a liquid pressure of the wheel brake, an electrically-driven pump having a suction side connected to the liquid pressure adjustment device, a suction passage connecting the suction side of the electrically-driven pump to the liquid pressure adjustment device, and a discharge passage connecting a discharge side of the electrically-driven pump to the main passage at a point between the liquid pressure generation device and the liquid pressure adjustment device. A first solenoid valve, which is operational in synchronism with discharge of the electrically-driven pump, is provided in the main passage between the liquid pressure generation device and a connecting point where the discharge passage is connected to the main passage. An auxiliary suction passage connects the liquid pressure generation device to the suction side of the electrically-driven pump, and a second solenoid valve is provided in the auxiliary suction passage between the liquid pressure generation device and the suction side of the electrically-driven pump. The second solenoid operates in synchronism with discharge of the electrically-driven pump and is a linear solenoid valve in which the degree of opening varies continuously. An auxiliary reservoir is provided in the suction passage between the liquid pressure adjustment device and the suction side of the electrically-driven pump for storing operation liquid. This configuration makes it possible to precisely control, with a simpler structure, the volume of operation liquid flowing from the liquid pressure generation device into the auxiliary suction passage so that it becomes smaller than the maximum accommodation capacity of the low-pressure reservoir. Therefore, the liquid pressure of the auxiliary suction passage is kept low and hence the absolute value of suction ripples is reduced to a small value.

The braking force control apparatus can also be provided with an actuator acting on the liquid pressure generation device for causing the liquid pressure generation device to generate a liquid pressure also when receiving no brake manipulation force. By pressurizing (pre-charging) the auxiliary suction passage, the suction performance of the electrically-driven pump is improved and hence the response speed of the pressurization control by the electrically-driven pump is increased.

According to another aspect of the invention, a vehicular braking force control apparatus includes a liquid pressure generation device for generating a liquid pressure according to a brake manipulation force, a main reservoir supplying operation liquid to the liquid pressure generation device, a wheel brake receiving the liquid pressure output from the liquid pressure generation device for braking a wheel, a main passage connecting the liquid pressure generation device to the wheel brake, a solenoid valve disposed in the main passage for adjusting liquid pressure in the wheel brake, an electrically-driven pump having a suction side connected to the liquid pressure adjustment device, a suction passage connecting the suction side of the electrically-driven pump to the liquid pressure adjustment device, a discharge passage connecting the discharge side of the electrically-driven pump to the main passage, and an auxiliary suction passage connecting the liquid pressure generation device to the suction side of the electrically-driven pump. A solenoid valve, operational in synchronism with discharge of the electrically-driven pump, is provided in the auxiliary suction passage between the liquid pressure generation device and the suction side of the electrically-driven pump. A low-pressure reservoir is provided in the auxiliary suction passage between the solenoid valve that is disposed in the auxiliary suction passage and the suction side of the electrically-driven pump for reducing suction ripple by reducing a pressure at the suction side of the electrically-driven pump in the auxiliary suction passage. The low-pressure reservoir includes an operation liquid portion that communicates with the auxiliary suction passage and an air portion in which exists air. The low-pressure reservoir is partitioned into the operation liquid portion and the air portion by a partition member, and a spring member is provided for pressing the partition member toward the operation liquid portion.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
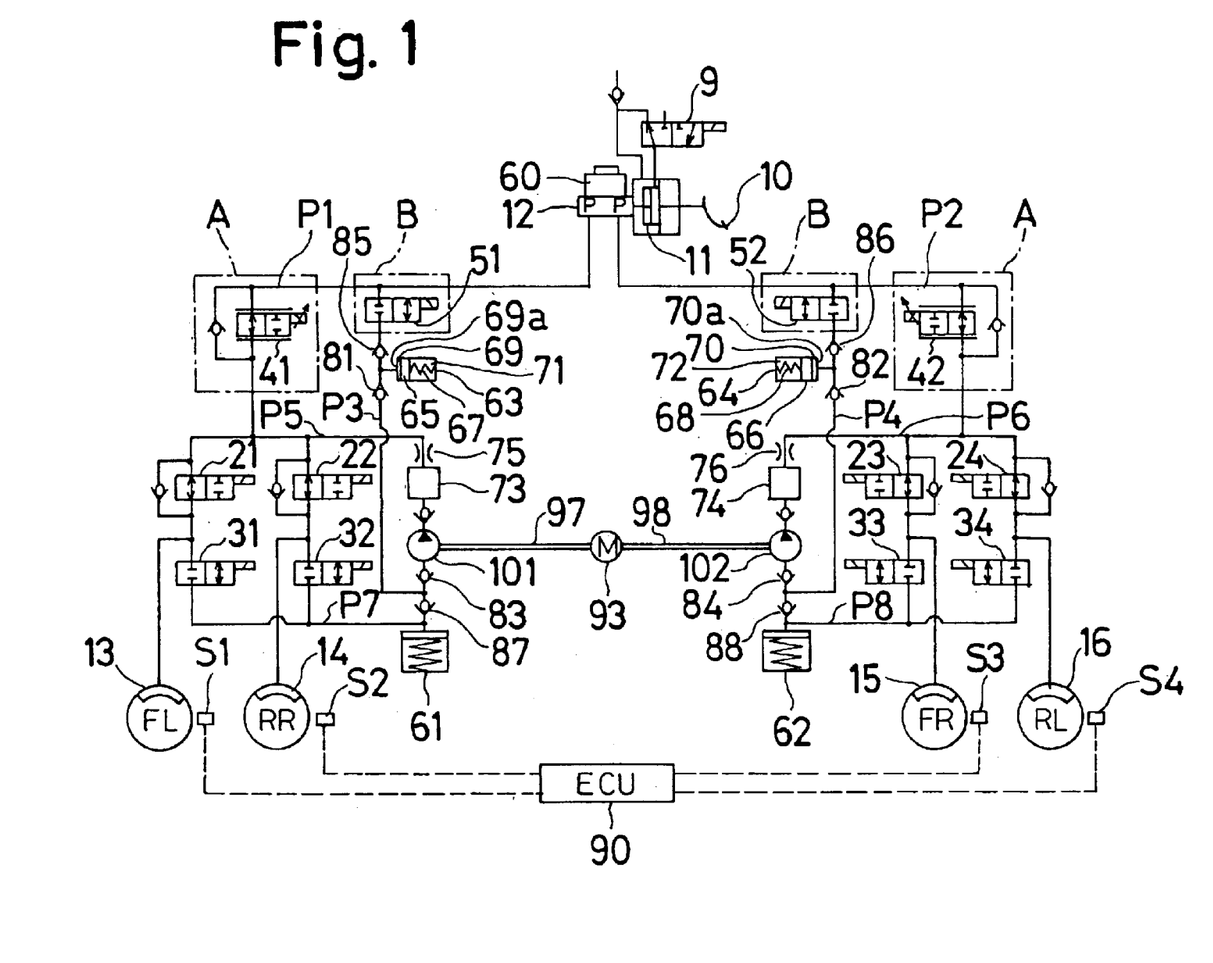
FIG. 1 is a schematic illustration of a vehicular braking force control apparatus according to a first embodiment of the present invention.

Referring initially to FIG. 1, a vehicular braking force control apparatus according to a first embodiment of the present invention includes a brake pedal 10 and a tandem master cylinder 12 (i.e., fluid or liquid pressure generation device) hereinafter referred to as a master cylinder. The master cylinder 12 generates a fluid pressure or liquid pressure corresponding to the manipulation or operational force applied to the brake pedal 10. A vacuum actuator 11 amplifies the manipulation force applied to the brake pedal 10 to cause the master cylinder 12 to generate a liquid pressure also when no manipulation force is applied to the brake pedal 10. A solenoid valve 9 supplies an engine negative pressure to the vacuum actuator 11. One pressure chamber of the master cylinder 12 is connected to a front-left wheel brake 13 and a rear-right wheel brake 14 via a main passage P1. A solenoid valve 41 constituting a first solenoid valve is provided in the main passage P1. A normally-open solenoid valve 21 constituting a liquid pressure adjustment device is provided between the solenoid valve 41 and the front-left wheel brake 13. Another normally-open solenoid valve 22 also constituting a liquid pressure adjustment device is provided between the solenoid valve 41 and the rear-right wheel brake 14. The above liquid pressure routes are ones that are effective in an ordinary braking state in which a unidirectional hydraulic pump 101 (electrically-driven pump), hereinafter referred to as a hydraulic pump, does not operate.

A normally-closed solenoid valve 31, constituting a liquid pressure adjustment device 31, is provided between an auxiliary reservoir 61 and the front-left wheel brake 13. Another normally-closed solenoid valve 32, also constituting a liquid pressure adjustment device, is provided between the auxiliary reservoir 61 and the rear-right wheel brake 14. By controlling the opening/closing timing of the solenoid valves 21, 31 or the solenoid valves 22, 32, the liquid pressure route to the front-left wheel brake 13 or the rear-right wheel brake 14 can be switched between three modes, a pressure reduction mode, a pressure maintaining mode, and a pressure increasing mode. Anti-skid control for preventing wheel locking during braking can thus be realized.

A normally-closed solenoid valve 51 constituting a second solenoid valve that is opened in synchronism with discharge of the hydraulic pump 101 and a check valve 81 constituting a first check valve that allows passage of operation liquid only from the solenoid valve 51 to the suction side of the hydraulic pump 101 are provided in an auxiliary suction passage P3 between the one pressure chamber of the master cylinder 12 and the suction side of the hydraulic pump 101. A ripple absorption low-pressure reservoir 63 is provided between the solenoid valve 51 and the check valve 81. The ripple absorption low-pressure reservoir 63 is composed of an operation liquid portion 69 that communicates with the auxiliary suction passage P3 and in which no operation liquid exists during ordinary suction of the hydraulic pump 101 and an air portion 71 where air exists. A partition member 65 partitions the low-pressure reservoir 63 into the operation liquid portion 69 and the air portion 71. During ordinary suction of the hydraulic pump 101, movement of the partition member 65 toward the auxiliary suction passage P3 side is restricted by a restriction portion 69a in the operation liquid portion 69. A spring member 67 for pressing the partition member 65 toward the operation liquid portion 69 side is provided in the air portion 71.

Two check valves 81, 83 which are provided between the ripple absorption low-pressure reservoir 63 and the suction side of the hydraulic pump 101 prevent backward flow of operation liquid. The discharge side of the hydraulic pump 101 is connected to the main passage P1 via a volume damper 73 and an orifice 75 arranged in a discharge passage P5. Therefore, by making the hydraulic pump 101 operational, and closing the solenoid valve 41 and opening the solenoid valve 51, liquid pressure can be supplied to the front-left wheel brake 13 or the rear-right wheel brake 14 and adjusted even when no braking manipulation is performed. That is, automatic braking, traction control, etc. can be realized.

Figure 6:
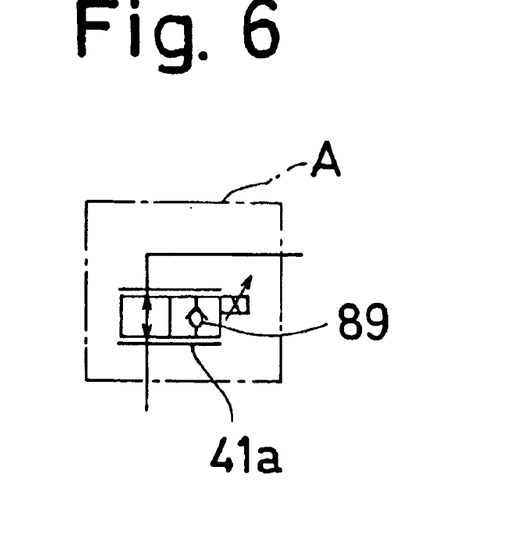
FIG. 6 illustrates the check valve incorporated in the first solenoid valve according to the first embodiment.
Figure 7:
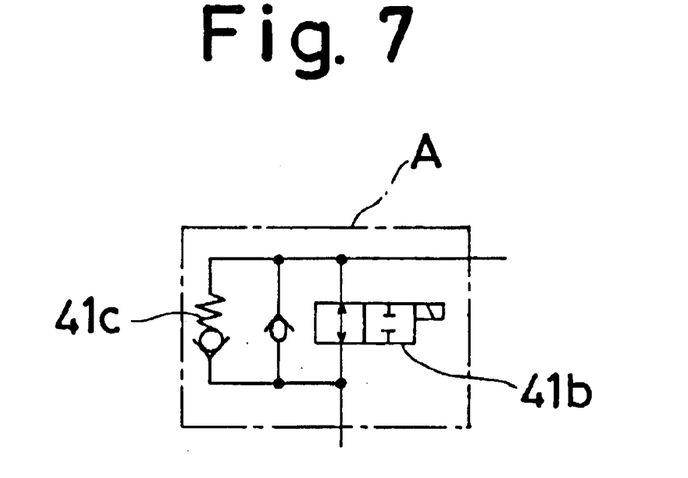
FIG. 7 illustrates a normally-open solenoid valve and a relief valve which can replace the first solenoid valve according to the first embodiment.

Part A in FIG. 1 may be the solenoid linear valve 41 as illustrated or may be a solenoid linear valve 41a incorporating a check valve 89 as shown in FIG. 6. As a further alternative, part A in FIG. 1 may be a hydraulic circuit in which a normally-open solenoid valve 41b and a relief valve 41c are provided in parallel as illustrated in FIG. 7.

Figure 8:
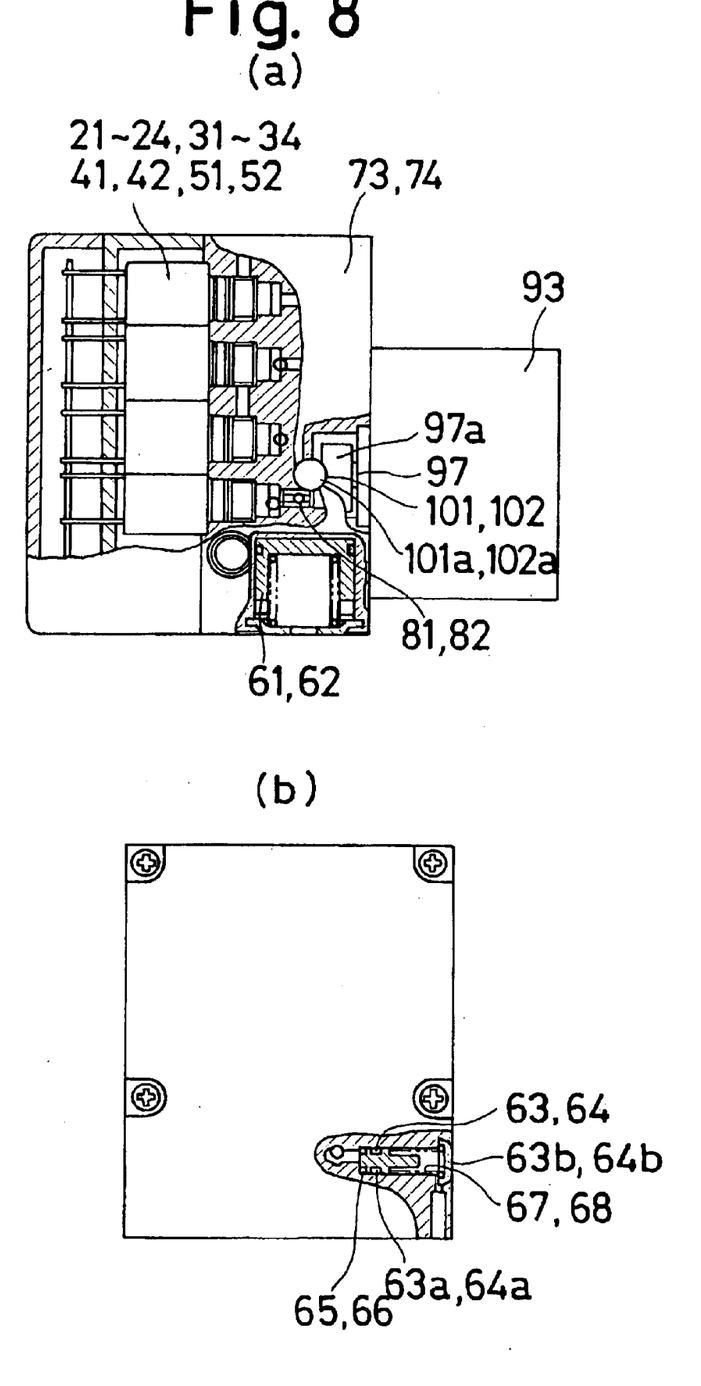
FIGS. 8A and 8B are partial cross-sectional views of a braking force control apparatus incorporating the ripple absorption low-pressure reservoir according to the present invention.

FIGS. 8A and 8B are partial cross-sectional views of an actual braking force control apparatus. The apparatus includes a motor shaft 97 provided with an eccentric cam 97a. As the motor shaft 97 rotates, the eccentric cam 97a causes reciprocating movement of a plunger 101a that is provided in a plunger chamber, whereby the hydraulic pump 101 is formed. By way of a suction passage P7, the hydraulic pump 101 sucks operation liquid from the auxiliary reservoir 61 whose axial line or axis is perpendicular to the axial line or axis of the plunger 101a. The ripple absorption low-pressure reservoir 63, which communicates with the auxiliary suction passage P3, is positioned a prescribed distance from the axial line of the plunger 101a and parallel with the axial line of the plunger 101a, is positioned a prescribed distance from the axial line of the auxiliary reservoir 61 and perpendicular to the axial line of the auxiliary reservoir 61, and is close to the auxiliary reservoir 61. The low-pressure reservoir 63 is composed of, among other features, the partition member 65, the spring member 67, a sealing member 63a and a cap 63b, and is partitioned by the partition member 65 into the operation liquid portion 69 that communicates with the auxiliary suction passage P3 and the air portion 71 that communicates with the air.

Figure 5:
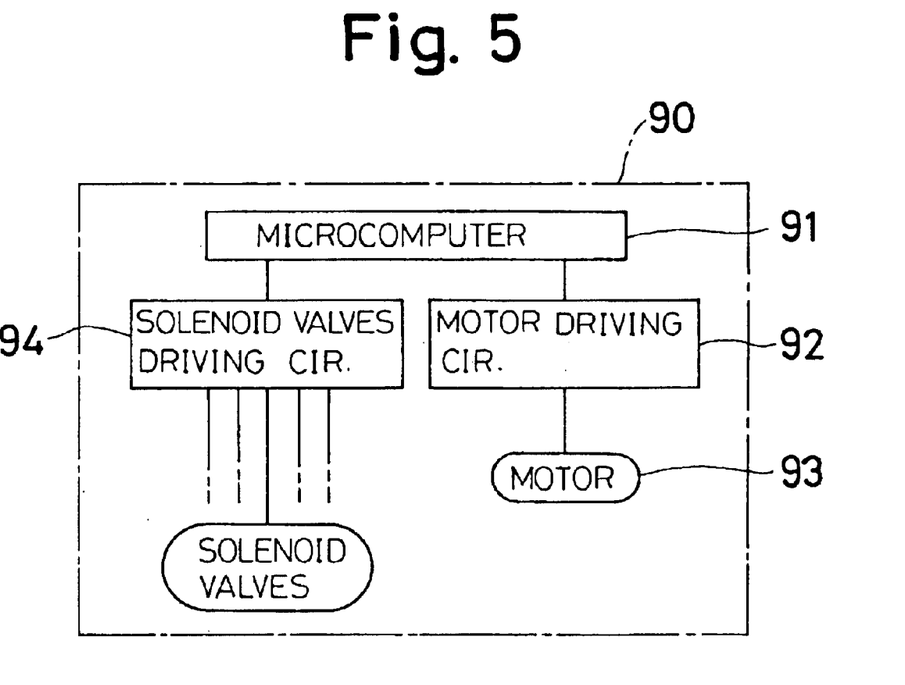
FIG. 5 is a schematic illustration of the electronic control unit (ECU) usable in connection with the present invention.

Referring to FIG. 1, the various controls described above are realized by processing signals from, for example, wheel speed sensors S1, S2 and a liquid pressure sensor. As shown in FIG. 5, the signals are processed with a microprocessor 91 in an ECU 90, and precisely control a motor 93, the solenoid valves 21, 31, etc.

The hydraulic circuit on the side of the front-left wheel brake 13 and the rear-right wheel brake 14 where the main passage P1 extends has been described above. It is to be understood that the hydraulic circuit on the side of the front-right wheel brake 15 and the rear-left wheel brake 16 where a main passage P2 extends has the same configuration. Thus, generally speaking, the other pressure chamber of the master cylinder 12 is connected to a front-right wheel brake 15 and a rear-left wheel brake 16 via the main passage P2. A solenoid valve 42 constituting a first solenoid valve is provided in the main passage P2. A normally-open solenoid valve 24 constituting a liquid pressure adjustment device is provided between the solenoid valve 42 and the rear-left wheel brake 16. Another normally-open solenoid valve 23 also constituting a liquid pressure adjustment device is provided between the solenoid valve 42 and the front-right wheel brake 15.

A normally-closed solenoid valve 34, constituting a liquid pressure adjustment device, is provided between an auxiliary reservoir 62 and the rear-left wheel brake 16. Another normally-closed solenoid valve 33, also constituting a liquid pressure adjustment device, is provided between the auxiliary reservoir 62 and the front-right wheel brake 15. By controlling the opening/closing timing of the solenoid valves 24, 34 or the solenoid valves 23, 33, the liquid pressure route to the rear-left wheel brake 16 or the front-right wheel brake 15 can be switched between three modes, a pressure reduction mode, a pressure maintaining mode, and a pressure increasing mode to permit realization of anti-skid control for preventing wheel locking during braking.

A normally-closed solenoid valve constituting a second solenoid valve 52 that is opened in synchronism with discharge of the hydraulic pump 102 and a check valve 82 constituting a first check valve that allows passage of operation liquid only from the solenoid valve 52 to the suction side of the hydraulic pump 102 are provided in an auxiliary suction passage P4 between the other pressure chamber of the master cylinder 12 and the suction side of the hydraulic pump 102. A ripple absorption low-pressure reservoir 64 is provided between the solenoid valve 52 and the check valve 82. The ripple absorption low-pressure reservoir 64 is composed of an operation liquid portion 70 that communicates with the auxiliary suction passage P4 and in which no operation liquid exists during ordinary suction of the hydraulic pump 102 and an air portion 72 where air exists. A partition member 66 partitions the low-pressure reservoir 64 into the operation liquid portion 70 and the air portion 72. During ordinary suction of the hydraulic pump 102, movement of the partition member 66 toward the auxiliary suction passage P4 side is restricted by a restriction portion 70a in the operation liquid portion 70. A spring member 68 for pressing the partition member 66 toward the operation liquid portion 70 side is provided in the air portion 72.

Two check valves 82, 84 which are provided between the ripple absorption low-pressure reservoir 64 and the suction side of the hydraulic pump 102 prevent backward flow of operation liquid. The discharge side of the hydraulic pump 102 is connected to the main passage P2 via a volume damper 74 and an orifice 76 arranged in a discharge passage P6. Therefore, by making the hydraulic pump 102 operational, and closing the solenoid valve 42 and opening the solenoid valve 52, liquid pressure can be supplied to the front-right wheel brake 15 or the rear-left wheel brake 16 and adjusted even when no braking manipulation is performed. That is, automatic braking, traction control, etc. can be realized.

The operation of the vehicular braking force control apparatus according to the first embodiment is as follows. When automatic braking, traction control, or the like is performed, the hydraulic pump 101 is made operational with actuation of the solenoid valves 41, 51 so that the solenoid valve 41 is closed while the solenoid valve 51 is opened. To compensate for response delay of the motor 93, pre-charge control is performed in which an engine negative pressure is supplied to the actuator 11 in advance to generate a liquid pressure in the master cylinder 12. If the hydraulic pump 101 starts operating in this state, operation liquid is sucked by the liquid pressure pump 101 via the auxiliary suction passage P3 and the check valve 83. However, because the hydraulic pump 101 can suck operation liquid only intermittently, the check valve 83 repetitively opens and closes also intermittently. Therefore, ripples due to suction (i.e., suction ripples) are generated in the auxiliary suction passage P3. It is known that the amplitude of such ripples is several times greater than that of the liquid pressure in the auxiliary suction passage P3. The ripples are transmitted to the master cylinder 12 via the solenoid valve 51, and a driver feels the ripples as uncomfortable vibrations.

In view of the above, in the first embodiment, the ripple absorption low-pressure reservoir 63 is provided between the solenoid valve 51 and the check valve 81. The low-pressure reservoir 63 is composed of the operation liquid portion 69 and the air portion 71 where air exists. The partition member 65 partitions the low-pressure reservoir 63 into the operation liquid portion 69 and the air portion 71. The spring member 67 for pressing the partition member 65 toward the operation liquid portion 69 side is provided in the air portion 71. Even if operation liquid flows into the auxiliary suction passage P3 by a volume larger than the discharge capacity of the hydraulic pump 101, the liquid pressure of the auxiliary suction passage P3 does not increase unduly because contraction of the spring member 67 part of that operation liquid is temporarily accommodated in the operation liquid portion 69 of the ripple absorption low-pressure reservoir 63. Therefore, the liquid pressure in the auxiliary suction passage P3 is kept low and hence the absolute value of the suction ripples is reduced to a relatively small value. Another advantage is obtained in that the ripple energy is absorbed by the sliding of the partition member 65 and the contraction of the spring member 67 of the ripple absorption low-pressure reservoir 63.

Figure 2:
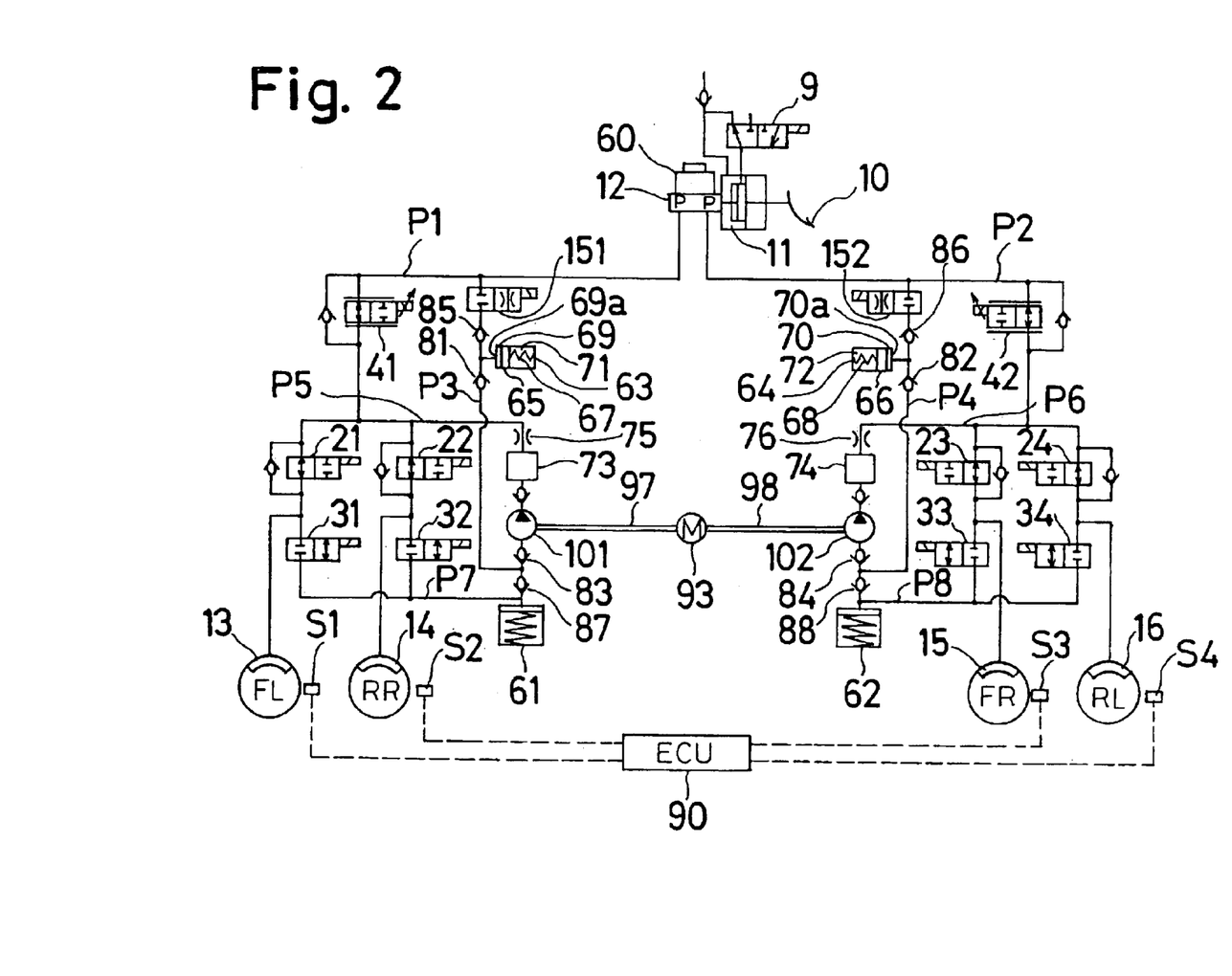
FIG. 2 is a schematic illustration of a vehicular braking force control apparatus according to a second embodiment of the present invention.

FIG. 2 illustrates the vehicular braking force control apparatus according to a second embodiment of the invention. The vehicular braking force control apparatus according to the second embodiment is configured in such a manner that the solenoid valve 51 in the first embodiment is replaced by an orifice-incorporated normally-closed solenoid valve 151. This orifice-incorporated normally-closed solenoid valve 151 is opened in synchronism with discharge of the hydraulic pump 101. In the opened state of the orifice-incorporated normally-closed solenoid valve 151, an orifice is presented as shown in FIG. 2.

The operation of the vehicular braking force control apparatus according to this second embodiment is as follows. Because the orifice-incorporated normally-closed solenoid valve 151, which is opened in synchronism with discharge of the hydraulic pump 101 and which exhibits an orifice at the time of opening, is provided between the master cylinder 12 and the hydraulic pump 101, liquid pressure generated by the master cylinder 12 is reliably reduced by the orifice. Therefore, the liquid pressure in the auxiliary suction passage P3 that is in proportion to the amplitude of the suction ripples is kept relatively low. This, together with the advantageous effect of the ripple absorption low-pressure reservoir 63 of the first embodiment, reduces the absolute value of the suction ripples to a relatively small value.

Figure 3:
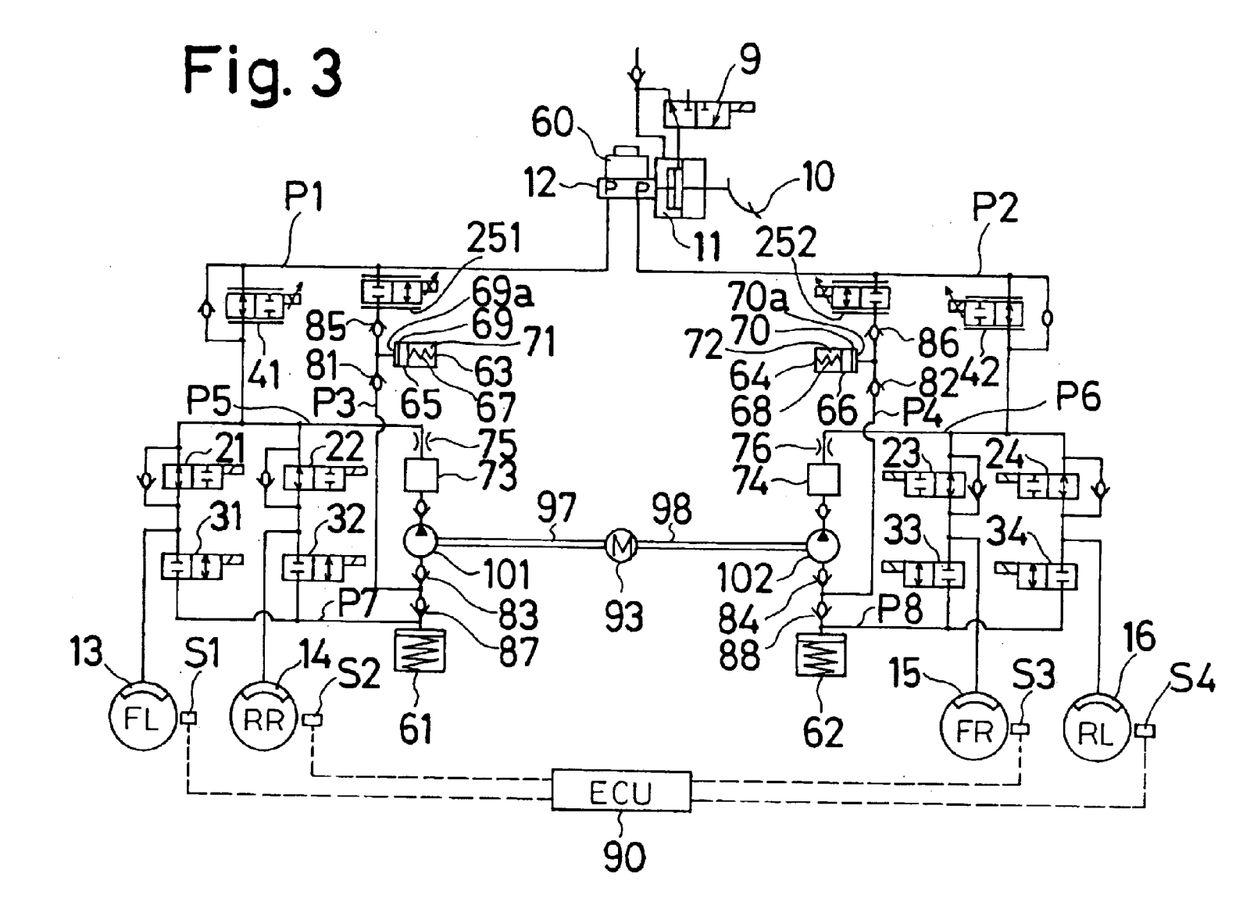
FIG. 3 is a schematic illustration of a vehicular braking force control apparatus according to a third embodiment of the present invention.

FIG. 3 illustrates the vehicular braking force control apparatus according to a third embodiment of the invention. The vehicular braking force control apparatus according to the third embodiment is configured so that the solenoid valve 51 in the first embodiment is replaced with a solenoid linear valve 251 that starts to operate in synchronism with discharge of the hydraulic pump 101 and whose degree of opening varies continuously. With this feature, the volume of operation liquid flowing from the master cylinder 12 into the auxiliary suction passage P3 can be precisely controlled so as to be smaller than the maximum accommodation capacity of the ripple absorption low-pressure reservoir 63. Therefore, the liquid pressure of the auxiliary suction passage P3 is kept low and hence the absolute value of the suction ripples is reduced to a relatively small value.

Figure 4:
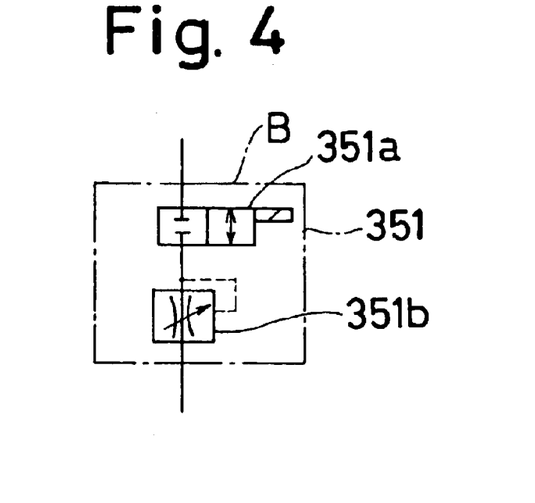
FIG. 4 shows a flow adjustment valve usable in a vehicular braking force control apparatus according to a fourth embodiment of the present invention.

FIG. 4 illustrates the vehicular braking force control apparatus according to a fourth embodiment of the invention. In this fourth embodiment, the vehicular braking force control apparatus is configured so that the solenoid valve 51 (second solenoid valve; part B in FIG. 1) in the first embodiment is replaced by a flow adjustment valve 351 that is composed of a flow adjustment valve 351b for adjusting the volume of operation liquid flowing from the master cylinder 12 into the auxiliary suction passage P3 in accordance with the liquid pressure generated by the master cylinder 12 and a normally-closed solenoid valve 351a. With this measure, the volume of operation liquid flowing from the master cylinder 12 into the auxiliary suction passage P3 can be precisely controlled to be smaller than the maximum accommodation capacity of the ripple absorption low-pressure reservoir 63. Therefore, the liquid pressure in the auxiliary suction passage P3 is kept low and hence the absolute value of the suction ripples is reduced to a relatively small value.

A vehicular braking force control apparatus according to a fifth embodiment of the present invention is configured in such a manner that a check valve 85 (second check valve) that allows passage of operation liquid only from the solenoid valve 51 side, the solenoid valve 151 side, the solenoid linear valve 251 side, or the flow adjustment valve 351 (second solenoid valve) side to the ripple absorption low-pressure reservoir 63 side is provided. The check valve 85 is illustrated in FIGS. 1–3 and it is to be understood that the check valve 85 is usable in conjunction with the four embodiments described above. This check valve 85 is located between the ripple absorption low-pressure reservoir 63 and the solenoid valve 51, the solenoid valve 151, the solenoid linear valve 251, or the flow adjustment valve 351. This measure prevents suction ripples in the auxiliary suction passage P3 from being transmitted to the master cylinder 12 side.

Figure 9:
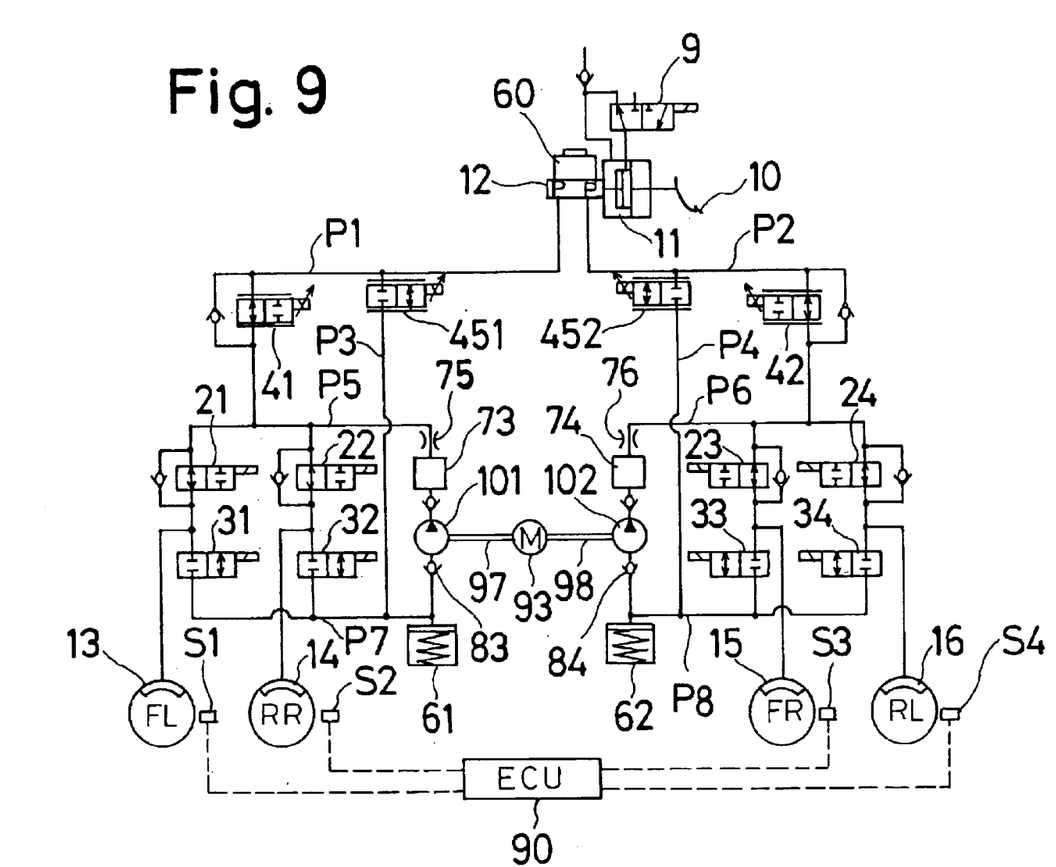
FIG. 9 is a schematic illustration of a vehicular braking force control apparatus according to a further embodiment of the present invention.

FIG. 9 illustrates the vehicular braking force control apparatus according to a sixth embodiment of the invention. According to this embodiment, the vehicular braking force control apparatus is configured so that a solenoid valve 451 (second solenoid valve) is provided in the auxiliary suction passage P3 between the master cylinder 12 and the suction side of the hydraulic pump 101. Controlling the degree of opening of the solenoid valve 451 makes it possible to precisely control, with a simpler structure, the volume of operation liquid flowing from the master cylinder 12 into the auxiliary suction passage P3 so that it becomes smaller than the maximum accommodation capacity of the ripple absorption low-pressure reservoir 63. Therefore, the liquid pressure of the auxiliary suction passage P3 is kept low and hence the absolute value of suction ripples is reduced to a relatively small value.

A vehicular braking force control apparatus according to a further embodiment of the present invention is configured so that in each of the first to sixth embodiments described above, the actuator 11 is provided that acts on the master cylinder 12 and causes the master cylinder 12 to generate a liquid pressure even when no manipulation force is applied to the brake pedal 10. With this arrangement, when automatic braking, traction control, or the like is performed, pre-charge control is enabled in which the engine negative pressure is applied to the actuator 11 in advance to generate a liquid pressure in the master cylinder 12. This compensates for discharge delay of the hydraulic pump 101 due to response delay of the motor 93, thereby increasing the response speed of the control.

By virtue of the present invention, it is possible to keep the pressure of the auxiliary suction passage low and hence to reduce the absolute value of suction ripples to a small value. The present invention also makes it possible to prevent suction ripples from being transmitted to the liquid pressure generation device. Additionally, the present invention makes it possible to increase the response speed of the control.

The principles, preferred embodiments and models of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the sprit and scope of the present invention as defined in the claims be embraced thereby.

What is claimed is:

1. A vehicular braking force control apparatus comprising:

a liquid pressure generation device for generating a liquid pressure according to a brake manipulation force;

a main reservoir for supplying operation liquid to the liquid pressure generation device;

a wheel brake receiving the liquid pressure output from the liquid pressure generation device for braking a wheel;

a main passage connecting the liquid pressure generation device to the wheel brake;

a liquid pressure adjustment device through which flows liquid pressure for adjusting a liquid pressure in the wheel brake;

an electrically-driven pump having a suction side connected to the liquid pressure adjustment device;

a suction passage connecting the suction side of the electrically-driven pump to the liquid pressure adjustment device;

a discharge passage connecting a discharge side of the electrically-driven pump to the main passage at a point between the liquid pressure generation device and the liquid pressure adjustment device;

a first solenoid valve provided in the main passage between the liquid pressure generation device and a connecting point where the discharge passage is connected to the main passage;

an auxiliary suction passage connecting the liquid pressure generation device to the suction passage;

a second solenoid valve provided in the auxiliary suction passage between the liquid pressure generation device and the suction side of the electrically-driven pump and operational in synchronism with discharge of the electrically-driven pump;

a first check valve provided in the auxiliary suction passage between the second solenoid valve and the suction side of the electrically-driven pump for allowing passage of operation liquid only in a direction from the second solenoid valve to the suction passage;

an auxiliary reservoir provided in the suction passage between the liquid pressure adjustment device and the suction side of the electrically-driven pump for storing operation liquid; and a low-pressure reservoir provided in the auxiliary suction passage between the second solenoid valve and the first check valve for reducing suction ripple by reducing a pressure at the suction side of the electrically-driven pump in the auxiliary suction passage, the low-pressure reservoir comprising an operation liquid portion that communicates with the auxiliary suction passage without passing through the electrically driven pump and an air portion where air exists, the low-pressure reservoir being partitioned into the operation liquid portion and the air portion by a partition member, the air portion being provided with a spring member for pressing the partition member toward the operation liquid portion, the operation liquid discharged from the liquid pressure adjustment device into the suction passage being blocked by the first check valve from flowing into the low pressure reservoir, and further comprising a second check valve provided between the second solenoid valve and the low-pressure reservoir for allowing passage of operation liquid only from the second solenoid valve toward the low-pressure reservoir.

2. A vehicular braking force control apparatus comprising:

a liquid pressure generation device for generating a liquid pressure according to a brake manipulation force;

a main reservoir for supplying operation liquid to the liquid pressure generation device; a wheel brake receiving the liquid pressure output from the liquid pressure generation device for braking a wheel;

a main passage connecting the liquid pressure generation device to the wheel brake;

a first solenoid valve disposed in the main passage for adjusting liquid pressure in the wheel brake;

an electrically-driven pump having a suction side connected to the first solenoid valve;

a suction passage connecting the suction side of the electrically-driven pump to the first solenoid valve;

a discharge passage connecting a discharge side of the electrically-driven pump to the main passage;

an auxiliary suction passage connecting the liquid pressure generation device to the suction passage;

a second solenoid valve, operational in synchronism with discharge of the electrically-driven pump, and provided in the auxiliary suction passage between the liquid pressure generation device and the suction side of the electrically-driven pump;

a first check valve provided in the auxiliary suction passage between the second solenoid valve and the suction side of the electrically-driven pump to permit passage of operation liquid only in a direction from the second solenoid valve to the suction passage; and a low-pressure reservoir provided in the auxiliary suction passage between the second solenoid valve that is disposed in the auxiliary suction passage and the suction side of the electrically-driven pump for reducing suction ripple by reducing a pressure at the suction side of the electrically-driven pump in the auxiliary suction passage, the low-pressure reservoir comprising an operation liquid portion that communicates with the auxiliary suction passage and an air portion in which exists air, the low-pressure reservoir being partitioned into the operation liquid portion and the air portion by a partition member, and a spring member for pressing the partition member toward the operation liquid portion, the operation liquid passing through the first solenoid valve and into the suction passage being blocked by the first check valve from flowing into the low pressure reservoir, and further comprising a check valve provided between the solenoid valve in the main passage and the low-pressure reservoir for allowing passage of operation liquid only from the solenoid valve in the main passage toward the low-pressure reservoir.

* * * * *